United States Patent

[11] 3,612,329

| [72] | Inventors | John W. Parks<br>Overland Park;<br>William K. Mathews, Prairie Village, both of Kans. |
|---|---|---|
| [21] | Appl. No. | 861,041 |
| [22] | Filed | Sept. 25, 1969 |
| [45] | Patented | Oct. 12, 1971 |
| [73] | Assignee | Union Tank Car Company<br>Chicago, Ill.<br>Continuation-in-part of Ser. No. 703,715, Feb. 7, 1968, abandoned. |

[54] TANK
11 Claims, 8 Drawing Figs.

[52] U.S. Cl. .................................................... 220/1 B, 220/18
[51] Int. Cl. .................................................... B65d 7/04, B65d 87/02
[50] Field of Search .......................................... 220/1 B, 18, 5 A, 83

[56] References Cited
UNITED STATES PATENTS

| 2,593,408 | 4/1952 | Boardman | 220/1 (B) |
| 2,672,254 | 3/1954 | Boardman | 220/1 (B) |
| 3,193,847 | 7/1965 | Mashura | 220/5 (A) X |

FOREIGN PATENTS

| 1,031,067 | 5/1958 | Germany | 220/1 (B) |
| 1,255,585 | 11/1967 | Germany | 220/83 |

Primary Examiner—George E. Lowrance
Attorneys—Hume, Clement, Hume & Lee and Charles M. Kaplan

ABSTRACT: A large tank for holding a fluid substance. Sidewalls of the tank are outwardly convex, or arcuate. The upper edges of the sidewalls are unrestrained so that a relatively high degree of distortion or freedom of the walls is permitted under a fluid head in the tank. The shear flow which is developed in the tank walls acts in summation as a horizontal beam which, anchored at its opposite ends to vertical beam-columns, supports the walls and contained fluid.

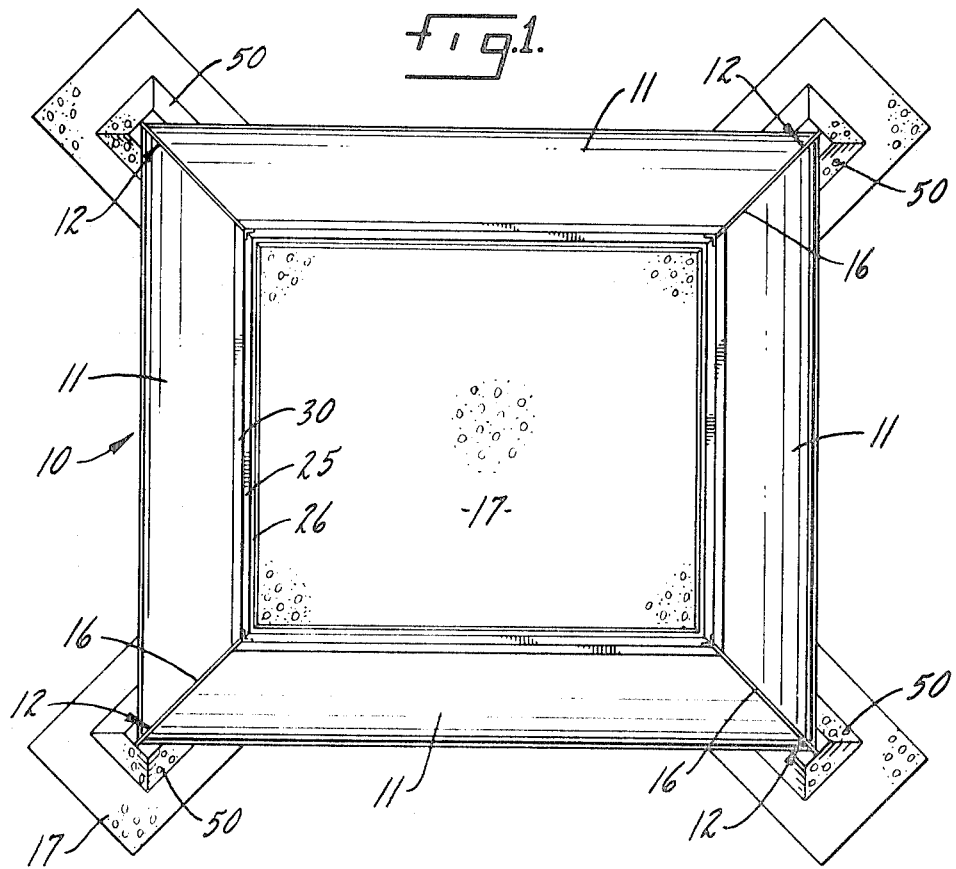
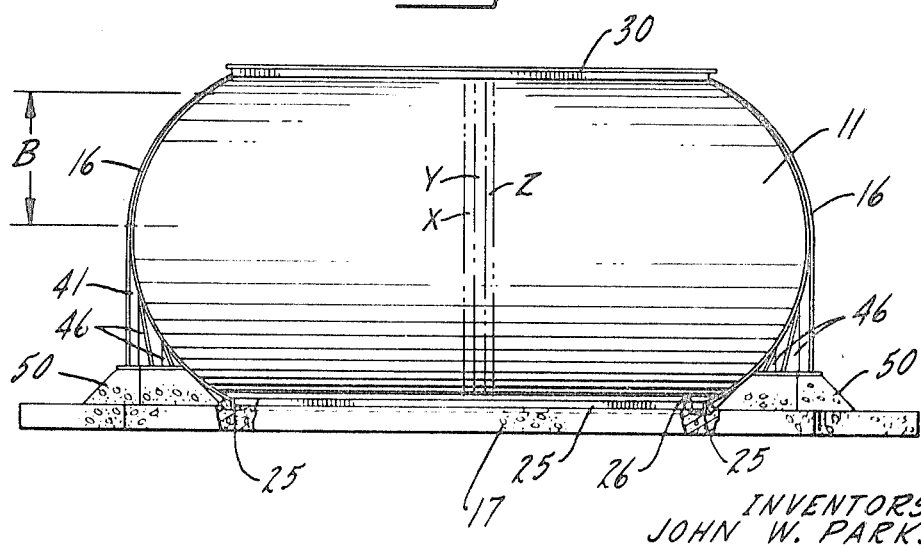
INVENTORS.
JOHN W. PARKS
WILLIAM K. MATHEWS
BY Hume, Clement, Hume & Lee
Attorneys.

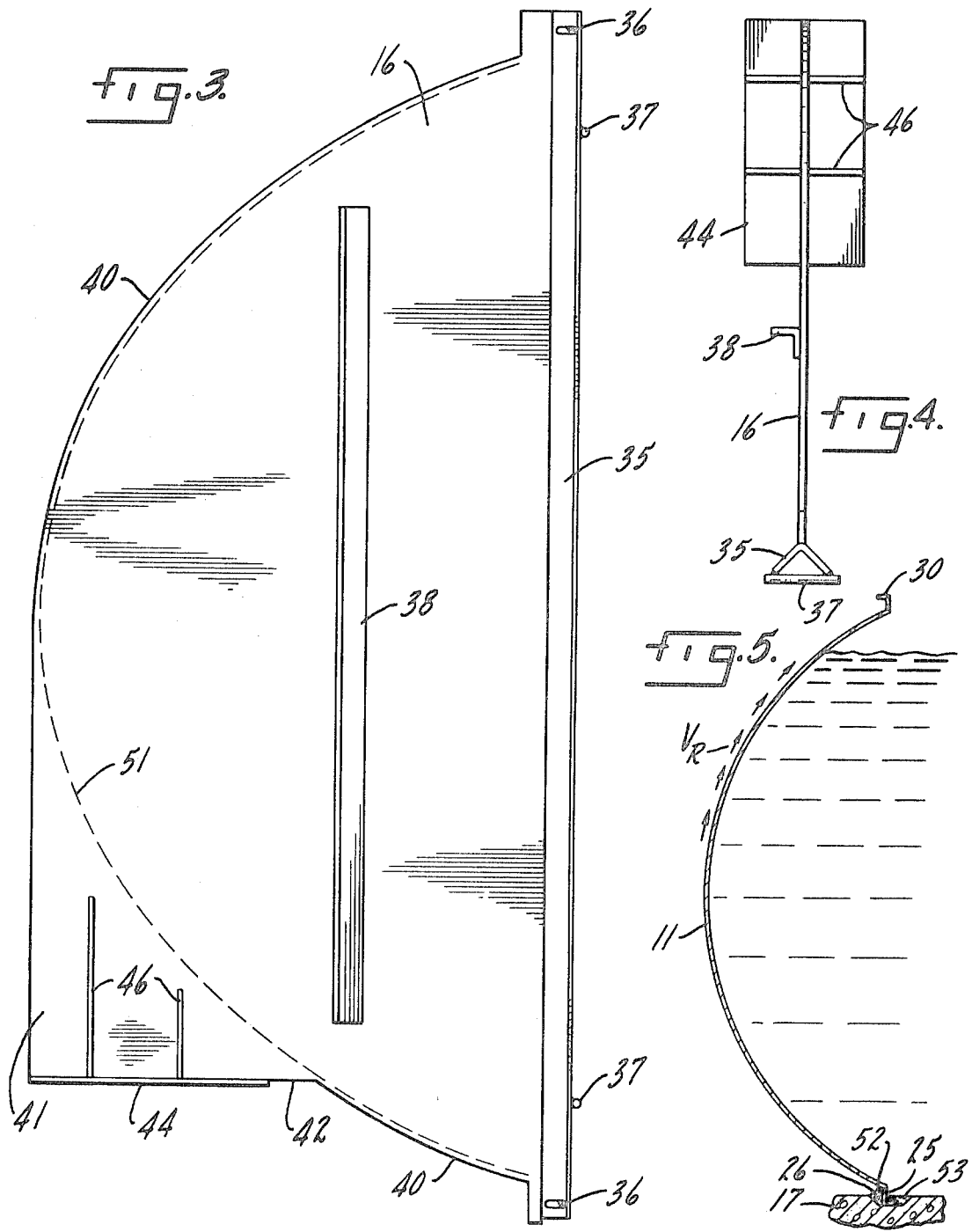

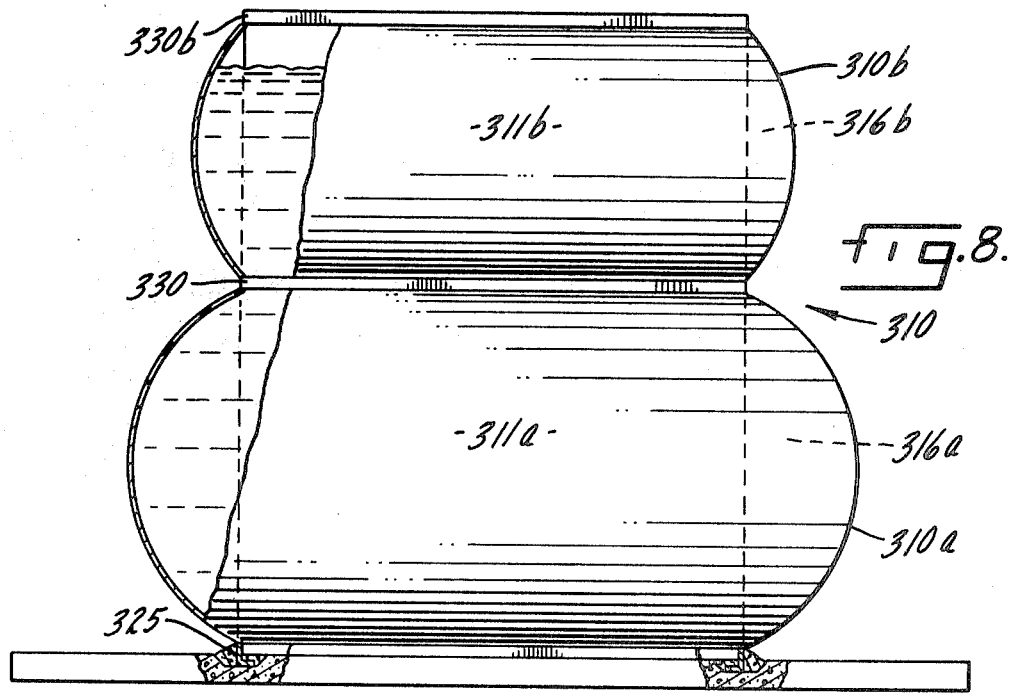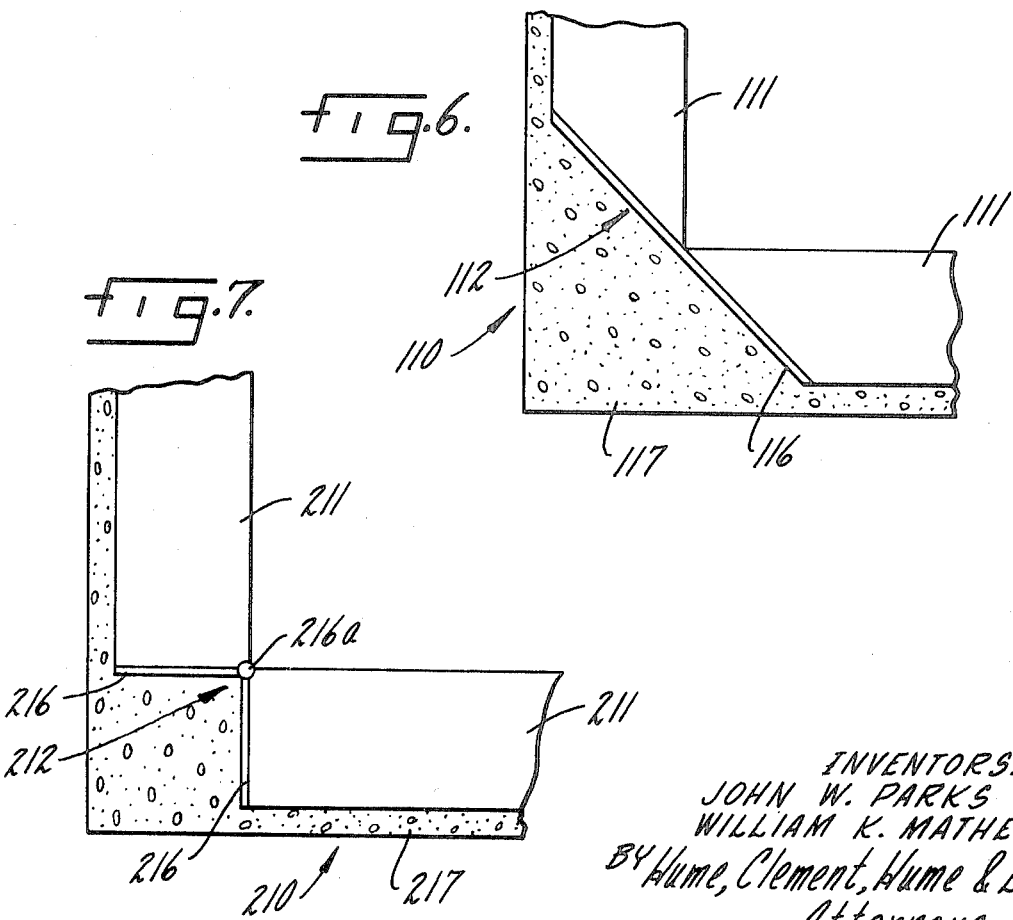

TANK

This application is a continuation-in-part of a copending application, Ser. No. 703,715, filed Feb. 7, 1968, and now abandoned.

BACKGROUND OF THE INVENTION

The invention is in the field of containers. It is, more particularly, concerned with large tanks for holding fluid substances such as liquids or the like.

In sewage treatment systems constructed for industrial complexes, for example, large tanks are employed in various capacities as aeration tanks and settling tanks and the like. These tanks are preferably fabricated in components at a manufacturing plant and then transported to an operations site where they are assembled.

For reasons of economy in both material costs and labor, it is desirable to construct such a tank with a minimum number of parts, a maximum number of which are substantially identical while achieving the highest strength-to-weight ratio possible. Colaterally, it is desirable that various prefabricated components of the tank be adaptable for nesting together for shipping.

The tanks presently known have significant deficiencies in their constructions which result in increased weight, for example, to obtain necessary structural strength. Heavier gauge plate, and increased numbers and more complicated arrangements of structural bracing, are called for, all at increased cost in materials and labor.

The best known conventional tank construction is, as might be expected, one employing vertically straight walls, and is normally either circular or rectangular in plan configuration. In order to safely contain a substantial head of liquid, such tanks require the use of relatively heavy sidewall plates and substantial structural bracing of the sidewalls.

Other tank constructions which might be employed are illustrated in the Boardman U.S. Pat. No. 2,593,408, and the German Lohle Pat. No. 269,789, for example. Each employs outwardly curved sidewalls in a tank for holding liquids or the like. Each also has substantial drawbacks, however, especially as to structural component weight and complexity, cost, and construction difficulties.

The Boardman tank employs a sidewall construction which is internally supported by strut trusses along its length. By varying the radius of the sidewalls and reacting the sidewalls with the strut trusses, Boardman maintains a constant vertical axial tension in the sidewalls. The horizontal component of this tension is taken up by Boardman's roof but, between the strut trusses, the vertical component of the tension is highly concentrated in the top of the sidewall creating excessive shear stress in response to high membrane moments at the top. Since the tank walls are not anchored down at their bases, unbalanced axial tension in the sidewalls also tends to lift the periphery of the tank floor between strut trusses. Boardman's tank construction requires strut trusses, necessarily closely spaced and, in addition, the roof, is expensive to fabricate and assemble.

The tank construction illustrated in the Lohle patent utilizes curved sidewalls also, although of different configuration. However, Lohle, with his carefully controlled "rope curves," essentially arrives at the same unattractive result achieved by Boardman. A top I-beam is required on each segment of the sidewall of Lohle to react against vertical tension in the sidewall and carry it to closely spaced, fragmented brace structures. The rigid I-beam along the top of each of the wall segments results in the concentration of shear stresses in these beams, between the braces. Lohle also provides a complicated, relatively heavy structure, which is expensive to fabricate, ship and assemble.

SUMMARY OF THE INVENTION

The tank construction of the present invention is considerably simpler than the prior art tank structures. It is lighter in weight, less expensive, more easily fabricated, transported and assembled. Nevertheless, the tank construction affords structural strength and integrity which is substantially greater than that found in known tank structures.

The tank structure which accomplishes these ends, according to the invention, has an outwardly convex, arcuate sidewall or walls having a continuous curvature from its lower to its upper edges. A primary object of the invention, in contrast to the tank wall constructions of the Boardman and Lohle patents, for example, is to permit a relatively high degree of distortion or freedom in the sidewall and utilize the shear flow which develops to react against hydraulic loads and overturning moments resulting from the fluid head in the tank. Distortion of the sidewall develops a reaction in shear flow which is relatively widely spread vertically in the sidewall. The shear flow reaction is, however, vertically centered in a position dependent substantially upon liquid level in the tank, but also upon the nature of the sidewall curvature employed. In this light, wall curvature might be varied widely in the present invention.

The shear flow is developed in the sidewall at its optimum vertical position along the horizontal length of the wall between vertical beam-columns to which the wall is tied at opposite ends. The sidewall acts, in this area, as a horizontal beam, the summation of the shear flow at this vertical level in the tank wall along the length of the wall establishing the beam effect.

A further object of the tank construction embodying features of the invention is thus to do away with special restrictions on sidewall radius and geometry, as well as closely spaced sidewall struts or braces. In addition, sidewall membrane bending moment is controlled with plates of minimum thickness. Regardless of whether the tank is full or partially full, the sidewall permissably distorts to define optimum areas of maximum shear flow counteracting side membrane bending moments.

In a principle embodiment of the invention, an open top tank is formed by three or more sidewall sections, arcuate about horizontal axes, and joined at mitred corners. The base of each sidewall is anchored in a slab base against vertical and horizontal movement as well as rotation about its line of anchorage. The sidewalls are joined at the mitred corners to opposite sides of vertically disposed corner plates which, also supported from the slab base, form the beam-column supports for the sidewalls acting as a beam and carrying the shear flow developed in the sidewalls.

It is conceivable, however, in a polygonal tank construction, that the corner structures might vary within the concept of the invention. As such, in one modification of the first form of the invention, a vertical buttressing plate secured to adjacent ends of tank sidewalls suitably beveled provides the beam-column support for the tank walls. In another modification of this form of the invention, separate end closure plates on the tank walls are joined to provide the support structure required. It is also contemplated that various other structural forms providing supports for the "shear flow" beams in the sidewalls of the tank structure embodying features of the invention might be employed. Such supports may provide either a fixed-ended, restrained-ended or pinned-ended condition for the "shear flow" beams.

The invention is also readily embodied in a tiered tank construction. In this alternative embodiment, separate arcuate walled tank sections constructed according to the invention are tiered, one on top of the other, with joinder being made solely at flanged connections and without structural beam bracing, for example. Although the wall curvature in different tiers of the tank constructed according to this form of the invention might vary, the composite reaction of the tank wall to membrane loads and bending moments is provided by shear flow at optimum levels in the respective walls.

BRIEF DESCRIPTION OF THE DRAWINGS

The invention, together with its construction and method of operation, along with various other objects and advantages thereof, is illustrated more or less diagrammatically in the drawings, in which:

FIG. 1 is a plan view of a tank embodying features of a first form of the invention;

FIG. 2 is a side elevational view of the tank illustrated in FIG. 1, with parts broken away;

FIG. 3 is an enlarged side elevational view of a beam-column corner plate for the tank illustrated in FIGS. 1 and 2;

FIG. 4 is a top plan view of the corner plate illustrated in FIG. 3;

FIG. 5 is a sectional view through a tank sidewall of the tank illustrated in the FIGS. 1 and 2;

FIG. 6 is a plan view of a modified corner construction for the tank illustrated in FIGS. 1 and 2, with parts broken away;

FIG. 7 is a plan view of another modified form of corner construction for the tank of FIGS. 1 and 2, with parts broken away; and FIG. 8 is a side elevational view of another form of tank embodying features of the invention, with parts broken away.

DESCRIPTION OF THE PREFERRED EMBODIMENTS

Referring now to the drawings and particularly to FIGS. 1 and 2, a sewage treatment aeration tank embodying features of one form of the present invention is illustrated generally at 10. The tank 10 is rectangular in plan view, as seen in FIG. 1, including four identical sidewalls 11, each having an arcuate configuration in vertical cross section.

The sidewalls 11 are joined at mitred corners 12 to opposite sides of vertically disposed corner plates 16. The sidewalls 11 are seated on and anchored to a concrete base slab 17. The corner plates 16 extend the vertical height of the sidewall 11 and are also anchored to the base 17.

Each sidewall 11 is fabricated of steel plate formed in an arc about a horizontal axis and cut on a bias at its opposite ends so as to mate, in a mitred corner, with a corresponding corner plate 16 and an adjacent sidewall. In the form of the invention illustrated, the sidewalls 11 each have segmented right cylinder configurations. This particular curve form is utilized solely because a constant radius is the simplest to form in steel plate, for example. The type of curve might actually vary considerably within the purview of the invention.

A horizontal angular flange 25 is formed in the base edge of each sidewall 11 and extends along its length. Each of these flanges 25 is, in turn, anchored in a keyway 26 suitably formed in the upper surface of the slab base 17. The flanges 25 and, accordingly, the lower edges of the walls 11, are anchored against vertical and horizontal movement, as well as against rotation about their anchorage.

Formed in the upper edge of each sidewall 11 is an upper flange 30. Each flange 30 extends the entire length of a corresponding sidewall edge and serves to stabilize the edge. For reasons hereinafter discussed, however, it is important to point out that the flanges 30 do not restrict the distortion of the sidewalls 11 under the load of a liquid within the tank. The flanges 25 and 30 are also mitred at opposite ends to mate with the corner plates 16.

Referring to FIG. 3, each corner plate 16 comprises a generally semicircular steel plate. An angle member 35 is welded to the vertical inner edge of the plate 16 and construction anchor apertures 36 are formed through the member 35. Cross bars 37 are welded to the member 35 to facilitate handling it. A vertically disposed angle member 38 is suitably welded to one side of each plate 16 to enhance the vertical rigidity of the plate.

As also seen in FIG. 3, the arcuate configuration of the outer edge 40 of the corner plate 40 is broken by a depending angular segment 41 formed unitarily with the plate. The angular segment 41 is unitary with the lower half of the plate 16 and has a horizontally extending lower edge 42 disposed a short distance above the lower extremity of the plate edge 40. A horizontal footing plate 44 is welded to the lower edge 42 of the segment 41 and vertically extending gusset plates 46 on either side of the segment 41, welded to it and to the footing plate 44 (see FIG. 4), brace the footing plate 44 in perpendicular relationship to the segment 41.

To erect the tank 10, a sidewall 11 is first seated in a corresponding keyway 26. A corner plate 16 is then attached to each end of the sidewall 11 by means of the apertures 36, similar apertures in the sidewall 11 and temporary assembly hardware.

Thereafter, another sidewall 11 is seated in a corresponding keyway 26 adjacent each of the upright corner plates 16. Each of these sidewalls 11 is attached to the corresponding corner plate 16 with which it is mated in the aforedescribed manner. Subsequently, two corner plates 16 are erected at the free ends of these newly erected sidewalls 11 and the sidewalls and corner plates are fitted together, also in the aforedescribed manner.

To close a rectangular tank, the last sidewall 11 is then erected between the last erected corner plates 16. This sidewall 11 is, in turn, fitted to the corresponding corner plates 16 in the aforedescribed manner. After all sidewalls 11 and corner plates 16 have been erected and attached to each other by temporary assembly hardware, tensioning means such as steel cable and a hand-operated hoist are rigged between all sidewalls 11 and corresponding sidewall on the opposing side of the tank.

This tensioning coupled with the natural flexibility of the unreinforced sidewalls causes the ends of the sidewalls, cut on a bias, to fit closely with a corresponding corner plate 16 on one side thereof immediately adjacent the edge 40 of the plate 16 along the length of the edge, as indicated in dotted lines at 51 in FIG. 3.

The sidewalls 11 are welded to the corner plates 16. The ends of flanges 25 and 30 are welded to the corner plates also. The temporary assembly hardware is removed from the apertures 36 and similar apertures in the sidewalls and the apertures are closed by welding.

The flanges 25 are anchored down in corresponding keyways 26 of the slab 17. A flexible sealant 53 is introduced to the keyways 26 inside of the tank to seal the joint between the lower edges of the sidewalls 11 and the slab base 17 so that the tank 10 will not leak. The keyways 26 outside of the tank are filled with a setting material 52, such as concrete, which serves to brace the lower edge of the sidewalls against rotation.

The concrete pedestals 50 between the footing plate 44 of the corner plate 16 and the base 17 are formed and cast.

When the tank 10 has been assembled in the aforementioned manner, it is ready for operation in its capacity as a sewage treatment tank or the like. As such, it contains suitable sewage treatment equipment (not shown) and is normally filled to a predetermined level near the top of the tank with sewage in a fluid form. The contained fluid sewage, depending upon its depth, exerts a predetermined load on the sidewalls 11 effective as an "overturning moment," tending to bend the walls 11 outwardly and, in addition, rotate them about their anchorage at the flanges 25 in the keyways 26 of the base 17.

This wall bending overturning force, created by the head of fluid sewage in the tank 10, creates a "bending moment" in the plate of the sidewalls 11 themselves. Since the upper edge of each curved wall 11 is not restrained by a structural member, however, having only a stabilizing flange 30 formed therein, the wall can, according to the invention, deform under the influence of this bending moment. This deformation sets up lines of generally vertical shear flow $V_r$, illustrated in FIG. 5, in each wall.

The shear flow is best envisioned between imaginary vertical strips of each sidewall 11. For purposes of illustration only, three of these imaginary strips are shown and identified as X, Y and Z in FIG. 2. In empirical calculations, these strips are considered to be one-inch in width, running the height of the sidewall 11, side-by-side, along its entire length from corner plate 16 to corner plate 16.

The shear flow stresses $V_r$ set up between the strips X, Y and Z, etc., react against the membrane loads and bending moment induced by the head of fluid in the tank. The principle area of shear flow reaction occurs in each tank sidewall 11 from a point in the wall somewhat above the fluid level in the tank 10 and extending downward over a limited but substantial arc of the sidewall. Accordingly, in the frequent condition of a full tank, it occurs in approximately the upper-half segment of each sidewall 11.

The summation of the shear flow $V_r$ between each linear segment X, Y and Z, etc., along the length of a sidewall 11, and its location, effectively locates and forms a "beam" in the sidewall material extending between the corner plates 16. The corner plates 16 thus stand as beam-columns supporting the beams located and formed by the summation of the shear forces $V_r$. Such a beam is diagrammatically illustrated for purposes of description as B in FIG. 2.

The beam B formed by the summation of these shear forces is effective to support the lower portions of the tank wall 11 and the contained fluid. Accordingly, in this form of the invention, the side plates 11 act as bottom fixed, top elastically restrained, two-directional shell membranes to contain the fluid. The contour of the sidewalls 11 is self-adjusting under load so that the vertical membrane axial loads, membrane bending moments, overturning fluid moments, and counteracting shear flow ($V_r$) are ideally distributed, depending upon the fluid level.

Referring now to FIG. 6, a modification of the tank 10 embodying features of the first form of the invention is illustrated generally at 110. The tank 110 is similar in construction and operation to the tank 10 hereinbefore discussed, with the exception that the sidewalls 111 of the tank 110 are joined at truncated corners 112, rather than mitred corners.

The sidewalls 111 are joined at the corners 112 by a vertically disposed corner plate 116. Each sidewall 111 is formed in an arc about a horizontal axis and cut on a reverse bias, as illustrated, so as to mate with the vertically disposed plate 116. Each corner plate 116, which is formed in the shape of an ellipse, is welded to corresponding edges of adjacent sidewalls 111. The sidewalls 111 and plate 116 are anchored in the slab base 117 in a manner similar to corresponding components of the tank 10.

Referring now to FIG. 7, another modification of the tank 10 embodying features of the first form of the invention is illustrated generally at 210. The tank 210 is, once again, similar in construction and operation to the tank 10 hereinbefore discussed. It differs from the tank 10 in that the sidewalls 211 of the tank 210 are joined at corner connections 212 capable of providing a pinned-end condition for the sidewall "shear flow" beams.

The sidewalls 211 are each closed at opposite ends by end plates 216. The end plates 216 are generally semicircular in configuration, conforming to the arcuate shape of the sidewalls 211, and are welded to them.

The inner edge of each vertically disposed plate 216 is attached, along the entire length, to a vertically extending structural member 216a. The structural member 216a is securely mounted on the base 217 in a suitable manner.

In both the tanks 110 and 210, illustrated in FIGS. 6 and 7, the buttress corner connection 112 and the corner connection 212 act as beam-column supports for the beams set up by shear flow in the sidewalls 111 and 211 of the respective tanks. As such, they function in a manner virtually identical to the mitred corners 12 described in relation to the tank 10 and a detailed description of their function would be redundant.

Attention is now directed to FIG. 8 where a second form of the tank construction embodying features of the invention is illustrated generally at 310. The tank 310 employs substantially the same principles of wall construction and operation as described in relation to the single tiered tank 10. As illustrated, however, it actually is constructed in a pair of vertically arranged tiers 310a and 310b. In this light, although two tiers are illustrated, more might well be employed.

The tiered tank 310 does function in a load carrying capacity in accord with the principles of the invention described in detail in relation to the tank 10, regardless of its multitiered construction. As such, the principle of freedom of the sides 311a and 311b of the tank 310 to deflect and, accordingly, resist the side hydraulic overturning moment by the development of shear flows in the sides is effected. Once again, the optimum location of reacting shear flows is set up for any side section geometry or condition of tank fullness.

The tiered tank 310 construction provides freedom for up, down, and sideways deflection of the tank walls 311a and 311b at their intersecting flange 330 and at the upper flange 330b in the top level tier 310b. The bottom of the lower tank 310a, at the flanges 325 of the sidewalls 311a, is anchored in a manner similar to that described in relation to the tank 10, preferrably in a manner developing side rotational fixity.

The subtle distinction between the multiple tiered tank 310 and the single tiered tank 10 hereinbefore described is that each tier above the bottom one develops a shear flow beam reaction in both the upper and lower wall sections of each wall 311b. Each of these beam reactions is carried longitudinally of the corresponding wall section to the end support, beam-column corner plates 316a and 316b. They support the shear flow beams in a manner hereinbefore discussed.

In addition, at the flange 330 tier intersection between the tank tiers 310b and 310a, the lower portion of the walls 311b adjacent to the flange 330 intersection tend to move slightly upward under the enclosed fluid load. In turn, the upper portion of the lower walls 311a tend to move relatively downward. This results in a wishbone or splitting action at the flange 330 intersection itself, with a resultant up, down, sideways, and rotational movement of the joint which is dependent upon the geometry of the sidewall curves, their thicknesses, and the span length of the walls. The forces and stresses created locally must be compatible with the wall thickness and weldments used. The creation of this effect at the flange 330 between the tiers 310a and 310b does not prohibit, but in fact permits, the overall system action to develop the deflections and corresponding reactive shear flows in the manner hereinbefore discussed.

What has been described in a tank construction concept, whether it be single tier or multitier, is that the top tank edge and connections between intermediate tiers are free to deflect in both sidewise and vertical directions. The reaction is permitted to develop as shear flow widely spread out vertically in the side shell and located at the optimum vertical position corresponding to any degree of tank fullness. Effective side membrane moment is minimized for any condition of tank fullness.

No top beam on the wall edges or roof tie between the upper edges is necessary. The thickness of the sidewalls need only be sufficient to handle minimal resultant side membrane moment in the walls. Membrane moment in the walls does not depend upon or necessitate closely spaced support structure. Unsupported side span lengths may be substantial for any reasonable sidewall thickness.

While several embodiments described herein are at present considered to be preferred, it is understood that various modifications and improvements may be made therein.

What is desired to be claimed and secured by Letters Patent of the United States is:

1. In a tank containing a fluidic substance, the improvement in sidewall construction, comprising:
   a. generally vertically disposed sidewall means,
   b. said sidewall means defining a continuous curve about horizontal axis means from generally horizontal lower edge means to generally horizontal upper edge means,
   c. said sidewall means being horizontally continuous between vertical beam-column means and composed of a series of imaginarily defined generally vertical wall strips making up its length, d. said upper edge means of said wall means being vertically and horizontally unrestricted by structural support means so as to be free to deflect vertically and horizontally, e. whereby hydraulic overturning moment of the fluid head in the tank which tends to bend said sidewall means outwardly causes said sidewall means to deflect at and below said upper edge, f. and generally vertical shear flow developed between said imaginary strips in reaction against said overturning moment as said sidewall means deflects is carried in summation longitudinally of said sidewall means to said beam-column means.

2. The improvement in sidewall construction in a tank of claim 1 further characterized by and including:

a. base means, b. said lower edge means being anchored on said base means against vertical, horizontal and rotational movement about its anchorage.

3. The improvement in sidewall construction in a tank of claim 2 further characterized in that:

a. said vertical beam-column means comprise structural members extending vertically from said base means and secured to corresponding vertically disposed edges of said sidewall means.

4. The improvement in sidewall construction in a tank of claim 3 further characterized in that:

a. said sidewall means comprises at least a pair of sidewalls angularly disposed relative to each other with reference to said base means, b. said pair of adjacent sidewalls meeting in a full mitred joint and secured along corresponding vertically disposed edges to corner plate means at said joint, c. said corner plate means being supported from said base means and extending upwardly substantially the height of the tank.

5. The improvement in sidewall construction in a tank of claim 3 further characterized in that:

a. said sidewall means comprises at least a pair of sidewalls angularly disposed relative to each other with reference to said base means, b. said pair of adjacent sidewalls meeting in a truncated corner and secured along corresponding vertically disposed edges to expose corner plate means at said corner, c. said corner plate means being supported from said base means and extending upwardly substantially the height of the tank.

6. The improvement in sidewall construction in a tank of claim 3 further characterized in that:

a. said sidewall means comprises a pair of sidewalls angularly disposed relative to each other with reference to said base means, b. each of said pair of adjacent sidewalls being secured along corresponding vertically disposed edges to and closed at a corresponding end by a separate end plate, c. each of said end plates being secured to vertical support means, d. said vertical support means extending upwardly from said base means substantially the height of the tank.

7. The improvement in sidewall construction in a tank of claim 1 further characterized in that:

a. said sidewall means comprises at least three horizontally straight sidewalls angularly disposed relative to each other with reference to said base means.

8. The improvement in sidewall construction in a tank of claim 7 further characterized in that:

a. said sidewall means defines a substantially constant radius curve about a horizontal axis from said lower edge means to said upper edge means.

9. The improvement in sidewall construction in a tank of claim 1 further characterized in that:

a. said vertical beam column means comprise structural members extending vertically from said base means and secured to corresponding vertically disposed edges of said sidewall means.

10. In a tank containing a fluidic substance, the improvement in sidewall construction, comprising:

a. generally vertically disposed sidewall means, b. said sidewall means defining at least one outwardly convex curve about a horizontal axis means from generally horizontal lower edge means to generally horizontal upper edge means, c. said sidewall means being horizontally continuous between vertical beam-column means and composed of a series of imaginarily defined generally vertical wall strips making up its length, d. said upper edge means of said wall means being vertically and horizontally unrestricted by support means so as to be free to deflect vertically and horizontally, e. whereby hydraulic overturning moment of the fluid head in the tank which tends to bend said sidewall means outwardly causes said sidewall means to deflect at and below said upper edge, f. and generally vertical shear flow developed between said imaginary strips in reaction against said overturning moment as said sidewall means deflects is carried in summation longitudinally of said sidewall means to said beam-column means.

11. The improvement in sidewall construction in a tank of claim 10 further characterized in that:

a. said sidewall means defines a vertically tiered plurality of sidewall sections, b. each of said sidewall sections defining a continuous curve about horizontal axis means from generally horizontal lower edge means to generally horizontal upper edge means.